United States Patent
Contreras Masse et al.

(10) Patent No.: US 10,735,246 B2
(45) Date of Patent: Aug. 4, 2020

(54) MONITORING AN OBJECT TO PREVENT AN OCCURRENCE OF AN ISSUE

(71) Applicant: ENT. SERVICES DEVELOPMENT CORPORATION LP, Houston, TX (US)

(72) Inventors: Roberto Antonio Contreras Masse, Ciudad Juarez (MX); Rong Pan, Sunnyvale, CA (US); Rajesh Dontula, Irving, TX (US); Dong Han, Shanghai (CN); Jun Wang, Shanghai (CN); Guo-Xiang Qin, Shanghai (CN); Easwaran Nadhan, Downers Grove, IL (US)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 5 days.

(21) Appl. No.: 15/110,938

(22) PCT Filed: Jan. 10, 2014

(86) PCT No.: PCT/CN2014/070429
§ 371 (c)(1),
(2) Date: Jul. 11, 2016

(87) PCT Pub. No.: WO2015/103764
PCT Pub. Date: Jul. 16, 2015

(65) Prior Publication Data
US 2016/0344583 A1    Nov. 24, 2016

(51) Int. Cl.
*H04L 12/24*    (2006.01)
*H04L 29/06*    (2006.01)
*H04L 12/26*    (2006.01)

(52) U.S. Cl.
CPC .......... *H04L 41/065* (2013.01); *H04L 41/046* (2013.01); *H04L 41/069* (2013.01);
(Continued)

(58) Field of Classification Search
CPC . H04L 63/1408; H04L 41/069; H04L 41/046; H04L 41/065; H04L 41/0654; H04L 43/16; H04L 63/20
See application file for complete search history.

(56) References Cited

U.S. PATENT DOCUMENTS

| 5,734,697 A | 3/1998 | Jabbarnezhad |
|---|---|---|
| 7,490,066 B2 | 2/2009 | Kronenberg et al. |

(Continued)

FOREIGN PATENT DOCUMENTS

| CN | 102819465 A | 12/2012 |
|---|---|---|
| CN | 103297543 A | 9/2013 |

(Continued)

OTHER PUBLICATIONS

IBM; "Proactive Application Monitoring"; Apr. 9, 2003; 8 pages.
(Continued)

*Primary Examiner* — Younes Naji
(74) *Attorney, Agent, or Firm* — Sheppard Mullin Richter & Hampton LLP (57) ABSTRACT

Monitoring an object to prevent an occurrence of an issue includes monitoring an object based on a number of parameters, categorizing messages of the object into categories while monitoring for a recurrence of a pattern of messages, detecting a potential issue with the object based on the recurrence of the pattern of messages, and alerting an operations manager agent of the potential issue to prevent an occurrence of the issue.

11 Claims, 7 Drawing Sheets

(52) U.S. Cl.
CPC .......... *H04L 41/0654* (2013.01); *H04L 43/16* (2013.01); *H04L 63/1408* (2013.01); *H04L 63/20* (2013.01)

(56) References Cited

U.S. PATENT DOCUMENTS

| | | | |
|---|---|---|---|
| 7,688,951 | B1 | 3/2010 | Bajpay et al. |
| 9,560,069 | B1* | 1/2017 | Agarwal ............. H04L 63/1416 |
| 2007/0260589 | A1* | 11/2007 | Yugami ............... G06F 11/3447 |
| 2008/0244319 | A1 | 10/2008 | Nehab et al. |
| 2008/0301810 | A1* | 12/2008 | Lehane ................... H04L 63/02 726/23 |
| 2010/0293407 | A1* | 11/2010 | Locasto ............. G06F 11/3672 714/2 |
| 2015/0026794 | A1* | 1/2015 | Zuk ........................ H04L 45/64 726/13 |

FOREIGN PATENT DOCUMENTS

| | | |
|---|---|---|
| CN | 103379099 A | 10/2013 |
| WO | WO-0117169 | 3/2001 |

OTHER PUBLICATIONS

PCT Search Report/Written Opinion ~ Application No. PCT/CN2014/070429 dated Oct. 9, 2014 ~ 14 pages.

Tarala, J.; "A Real-time Approach to Continuous Monitoring"; Feb. 2011; 14 pages.

* cited by examiner

MONITORING AN OBJECT TO PREVENT AN OCCURRENCE OF AN ISSUE

BACKGROUND

An application component is used to execute an application, such as an operating system or a program. The application component may be a server, a network, a processor, a user device, or other application components. Further, log files record events taking place on the application component during the execution of the application. The log files may be used to understand the activity of the application component.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical elements.

DETAILED DESCRIPTION

An object, such as an application component, is monitored to determine the object's availability, performance, or overall health. The object may be monitored manually or electronically to determine such information. If an object has an issue with availability, performance, or overall health, a user's experience with the object may be negatively impacted. For example, the user may experience errors, delay, and other issues while interacting with the object. If an issue with the object's availability, performance, or overall health is detected, an administrator may remediate the issue by manually restoring full service to the object.

Manually monitoring objects and restoring service to the objects can be a burdensome task for the administrator. Usually, the administrator monitors thousands of objects. Manually monitoring thousands of objects introduces significant delays in detecting an issue with any particular object and restoring full service for that object. Significant delays impact user satisfaction and customer relationships. This can result in loss of revenue for a business.

Further, manually monitoring thousands of objects may be error-prone. If the administrator is monitoring thousands of objects, it is very likely that the administrator could make an error or overlook an issue. If the administrator makes an error while manually monitoring thousands of objects, the administrator may work on restoring service to an object that is not the cause of an issue. As a result, the issue may still remain.

The principles described herein include a method for monitoring an object to prevent an occurrence of an issue. Such a method includes monitoring an object based on a number of parameters, categorizing messages of the object into categories based on message type while looking for a recurrence of a pattern of the messages, detecting an issue with the object based on the recurrence of the pattern of the messages, and alerting an operations manager agent of the issue to prevent an occurrence of the issue. Such a method allows an object's availability, performance, and/or overall health to be constantly monitored such that the method predicts, in advance, an issue that may occur with the object. As a result, a user's experience with the object will not be negatively impacted.

Further, the method can include analyzing patterns of the messages received from the object. Analyzing the patterns of the messages received from the object will be described in more detail below.

In the present specification and in the appended claims, the term "object" is meant to be understood broadly as an item that is being monitored. In one example, an object may be an application component, a log file, other objects, or combinations thereof.

In the present specification and in the appended claims, the term application component is meant to be understood broadly as a combination of hardware and programming code that is used to execute an application, such as an operating system or a program. In one example, an application component may be a server, a network, a processor, a computer, other application components, or combinations thereof.

In the present specification and in the appended claims, the term "log file" is meant to be understood broadly as a record of events taking place during the execution of an application. In one example, a log file may be used to understand the activity of the application or corresponding application component and diagnose issues with the application or the application component.

In the present specification and in the appended claims, the term "message" is meant to be understood broadly as discreet information of an object as to the status of an object's availability, performance, resources, and overall health. For example, a message may indicate that an object's availability, performance, resources, and/or overall health are satisfactory. Alternatively, a message may indicate that an object's availability, performance, resources, and/or overall health are not satisfactory.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
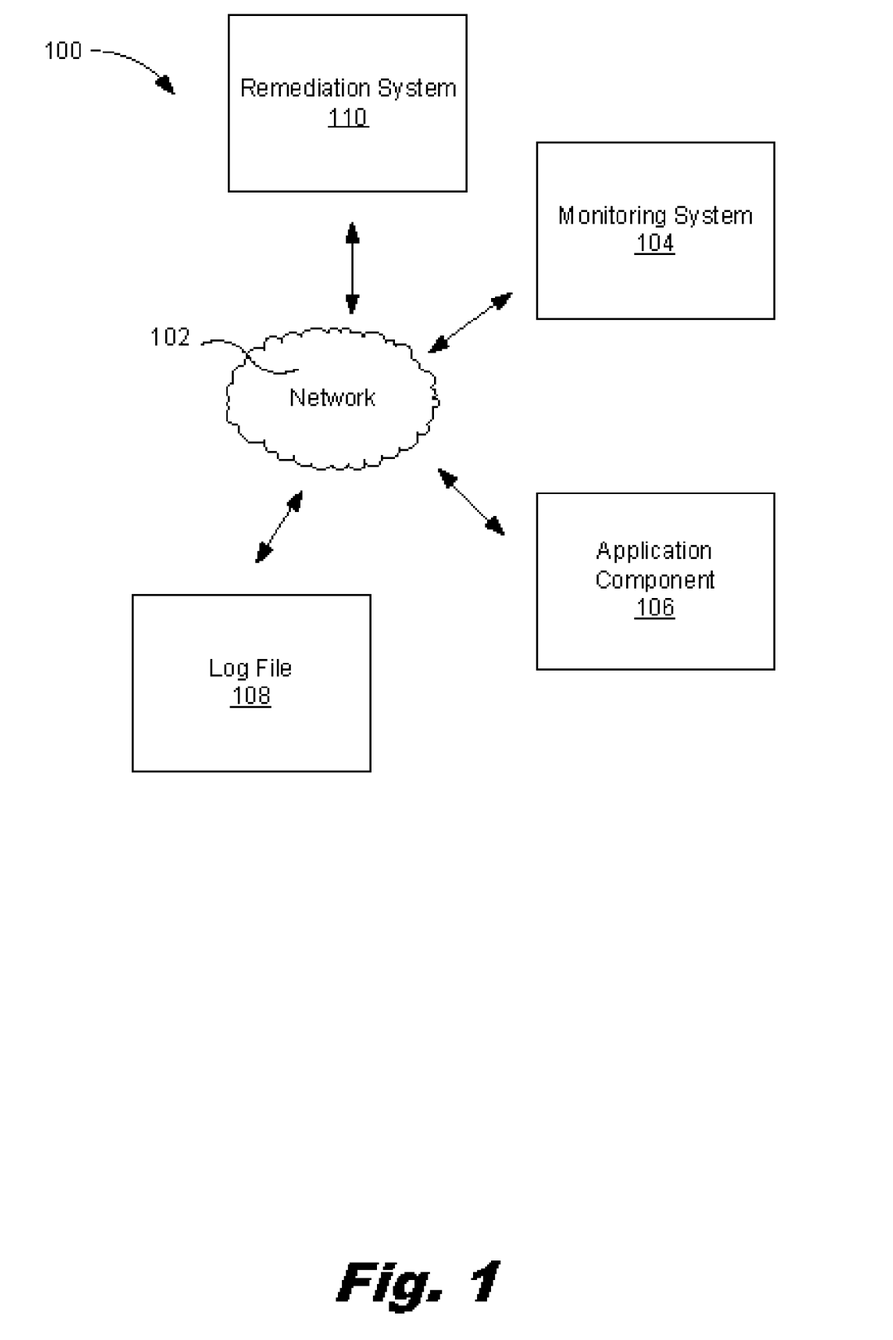
FIG. 1 is a diagram of an example of a system for monitoring an object to prevent an occurrence of an issue, according to one example of principles described herein.

Referring now to the figures, FIG. 1 is a diagram of an example of a system for monitoring an object to prevent an occurrence of an issue, according to one example of principles described herein. As will be described below, a monitoring system is in communication with a network to monitor an object based on a number of parameters. Further, the monitoring system instantiates a remediation function for remediating the issue based on policies of the operations manager agent. Further, the monitoring system may instantiate several remediation functions for multiple occurrences of an issue.

As illustrated in FIG. 1, the system (100) includes a monitoring system (104). The monitoring system (104) monitors an object based on a number of parameters. In one example, the monitoring system (104) may monitor an object such as an application component (106). In this example, the application component (106) may be a web server. As will be described in later parts of this application, the monitoring system (104) may monitor the application component (106) based on parameters such as a monitoring frequency parameter, a threshold parameter, performance parameters, availability parameters, resource parameters, other parameters, or combinations thereof.

In another example, the monitoring system (104) may monitor an object such as a log file (108). As will be described in later parts of this application, the monitoring system (104) may monitor the log file (108) based on parameters such as location parameters, log file parsing parameters, other parameters, or combinations thereof. More information about monitoring an object based on a number of parameters will be described detail later in this specification.

Further, the monitoring system (104) categorizes messages of the object into categories based on message type while monitoring for the occurrence or recurrence of a pattern of messages. More information about categorizing messages of the object into categories and monitoring for the recurrence of a pattern of messages will be described in detail later in this specification.

Further, the monitoring system (104) detects an issue with the object based on the recurrence of the pattern of the messages. In one example, detecting an issue with the object based on the recurrence of the pattern of the messages includes comparing the number of times the recurrence of the pattern of the messages occurs over a period of time with a threshold parameter. More information about detecting an issue with the object based on the recurrence of the pattern of the messages will be described detail later in this specification.

Further, once a potential issue has been detected, the monitoring system (104) alerts an operations manager agent of the potential issue to prevent an actual occurrence of the issue. In one example, by alerting the operations manager agent of the issue, the monitoring system (104) instantiates a remediation function for remediating the issue based on policies of the operations manager agent. In one example, instantiating the remediation function for remediating the issue based on policies of the operations manager agent includes sending the issue to a remediation system (110). The remediation system (110) remediates the issue based on the policies of the operations manager agent. More information about instantiating the remediation function for remediating the issue based on the policies of the operations manager agent will be described in detail later in this specification.

The monitoring system (104) allows an object's availability, performance, resources, and/or overall health to be constantly monitored such that the monitoring system (104) predicts, in advance, an issue that may occur with the object. As a result, a user's experience with the object may not be negatively impacted by the issue. More information about the monitoring system (104) will be described later in this specification.

While this example has been described with reference to the monitoring system being located over the network (102), a monitoring system may be located in any appropriate location according to the principles described herein. For example, the monitoring system may be located in a user device, a server, an application component, a database, other locations, or combinations thereof.

Figure 2:
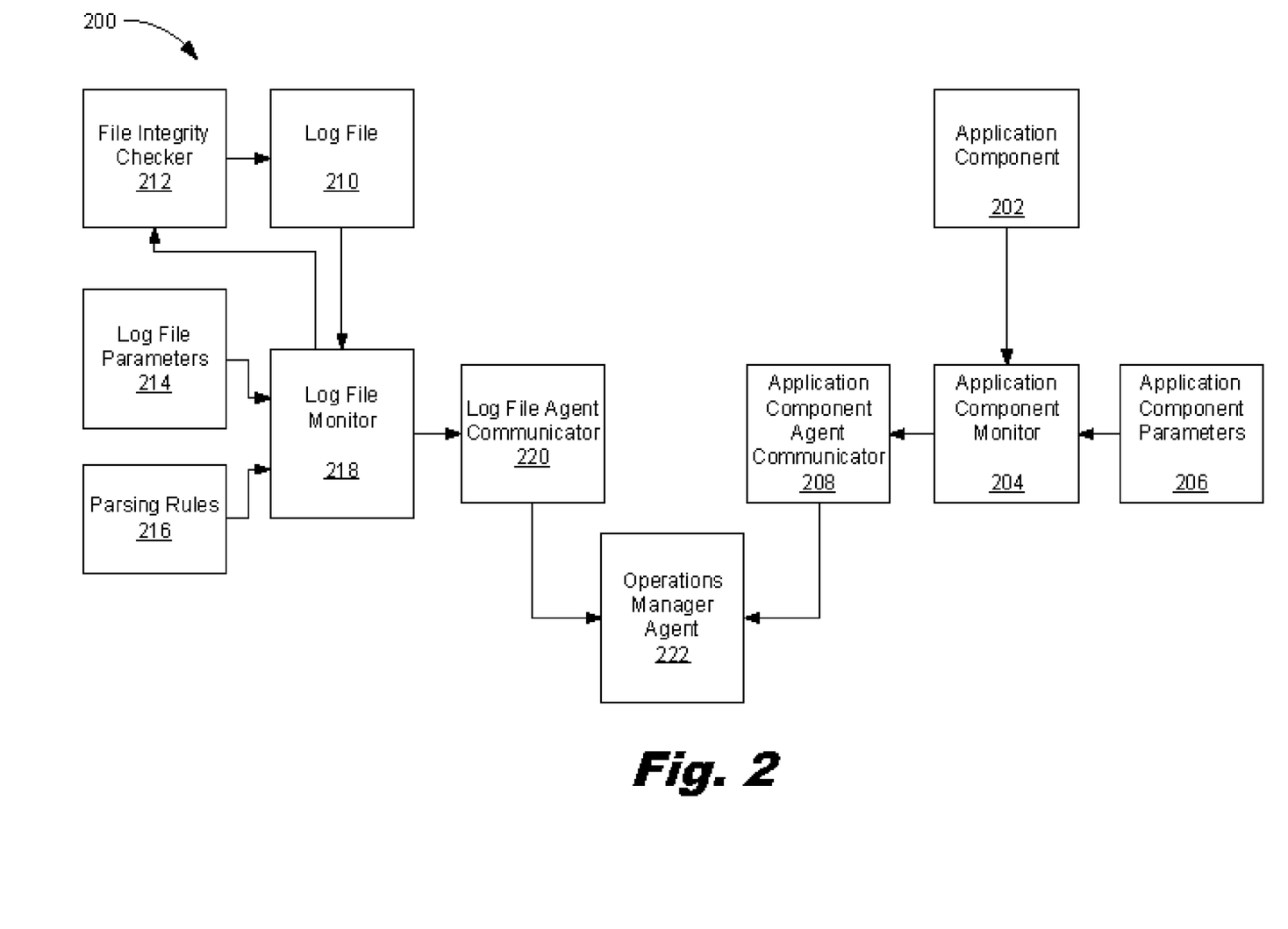
FIG. 2 is a diagram of an example of a monitoring system, according to one example of principles described herein.

FIG. 2 is a diagram of an illustrative monitoring system, according to one example of principles described herein. As mentioned above, a monitoring system monitors an object such as a log file, an application component, or combinations thereof based on a number of parameters. Further, the monitoring system remediates any issues with the object that is being monitored via an operations manager agent.

As illustrated in FIG. 2, the monitoring system (200) monitors objects such as an application component (202) and a log file (210). In some example, a relationship between the application component (202) and log file (210) may exist. For example, the log file (210) may be recording events taking place within the application component (202). In other examples, a relationship between the application component (202) and the log file (210) may not exist. In the example below, a relationship between the application component (202) and the log file (210) does not exist.

An example for monitoring an application component (202) will now be described with reference to FIG. 2. As illustrated in FIG. 2, the application component (202) is monitored by an application component monitor (204) for performance, availability, and resources. In this example, the application component monitor (204) monitors the application component (202) based on a number of parameters. In this example, the application component parameters (206) include a monitoring frequency parameter, a threshold parameter, performance parameters, availability parameters, resource parameters, an application install location parameter, a port number parameter, a user name parameter, other parameters, or combinations thereof.

Further, the application component parameters may be used to link the application component monitor (204) to the application component (202). In one example, the application component monitor (204) interrogates the application component (202) for performance, availability, and resources. For example, the application component monitor (204) may interrogate the application component (202) regarding the application component's performance. In this example, values for the performance parameters of the application component (202) are received. In one example, the values for the performance parameters of the application component (202) are received by the application component monitor (204). Similarly, the application component monitor (204) may interrogate the application component (202) for the application component's availability and resources.

In this example, the values received for the application component's performance, availability, and resources are compared against threshold parameters to identify a potential issue, an ongoing issue, or combinations thereof. For example, the application component monitor (204) detects an issue with the application component (202) based on values of a predefined set of threshold parameters. In this example, the application component threshold parameters (206) may include threshold performance parameters, threshold availability parameters, and threshold resource parameters. Further, the threshold parameters monitored may vary for a specific application component. The application component monitor (204) detects an issue when any one of the values received reaches a value that is out of the range of values specified in the threshold parameter. In this example, if any one of the values received reaches a value that is out of the range of values specified in the threshold parameter, the application component monitor (204) alerts an operations manager agent (222) via an application component agent communicator (208) of the issue to prevent an occurrence of the issue.

In another example, the application component monitor (204) categorizes messages of the application component (202) into categories based on a recurrence of a pattern of the messages. In one example, the application component monitor may receive messages from the application component (202). For example, the application component monitor (204) may receive messages such as performance messages, availability messages, resource messages, or combinations thereof. Further, the application component monitor (204) detects an issue with the application component (202) based on the recurrence of a pattern of the performance messages, availability messages, resource messages, or combinations thereof. For example, detecting the issue with the application component (202) based on the recurrence of the pattern of the messages includes comparing the number of times the recurrence of the pattern of the messages, for the application component (202), occurs over a period of time with a threshold parameter. In this example, if the number of times the pattern of messages for the application component (202) recurs over a period of time is greater than the threshold parameter, the application component monitor (204) alerts an operations manager agent (222) via an application component agent communicator (208) of the issue to prevent an occurrence of the issue.

As will be described in FIG. 3, the operations manager agent (222) instantiates a remediation function for remediating the issue based on policies of the operations manager agent, by communicating the issue to other components such as a remediation system. Alternatively, if the number of times the recurrence of the pattern of the messages, for the application component (202), occurs over a period of time is less than the threshold parameter, the application component monitor (204) does not alert the operations manager agent (222) since an issue is not detected.

An example of monitoring a log file (210) will now be described with reference to FIG. 2. As illustrated in FIG. 2, the log file (210) is monitored by a log file monitor (218). In one example, the log file monitor (218) receives the location of the log file (210) from available log file parameters (214). For example, the log file parameters (214) may indicate that the log file (210) is stored in a location such as a database. In another example, the log file parameters (214) may indicate that the log file (210) is stored in a location such as on the corresponding application component.

Further, the system (200) includes a file integrity checker (212) to validate a checksum of the log file (210). For example, the checksum may be a datum computed from an arbitrary block of digital data for the purpose of detecting issues with the log file (210). In one example, the issues may have been introduced during the transmission or storage of the log file (210).

The log file monitor (218) further categorizes messages of the log file (210) into categories based on message type while monitoring for the recurrence of a pattern of messages. In one example, the log file monitor (218) categorizes the messages of the log file (210) by reading the log file (210) and parsing the log file (210) based on parsing rules (216). The parsing rules (216) may indicate to parse the log file (210) based on a string, a character, a variable, other parsing rules, or combinations thereof.

The log file monitor (218) detects an issue with the log file (210) based on the recurrence of the pattern of the messages. In one example, detecting the issue with the log file (210) based on the recurrence of the pattern of the messages further includes comparing the number of times the pattern of the messages for the log file (210) recurs over a period of time with a threshold parameter.

In this example, if the number of times the pattern of messages for the log file (210) recurs over a period of time is greater than the threshold parameter, the log file monitor (218) alerts an operations manager agent (222) via a log file agent communicator (220) of the potential issue to prevent an occurrence of the issue. As will be described in FIG. 3, the operations manager agent (222) instantiates a remediation function for remediating the issue based on policies of the operations manager agent, by communicating the issue to several other components, such as a remediation system. Alternatively, if the number of times the pattern of messages for the log file (210) recurs over a period of time is less than the threshold parameter, the log file monitor (218) does not alert an operations manager agent (222) since an issue is not detected.

Figure 3:
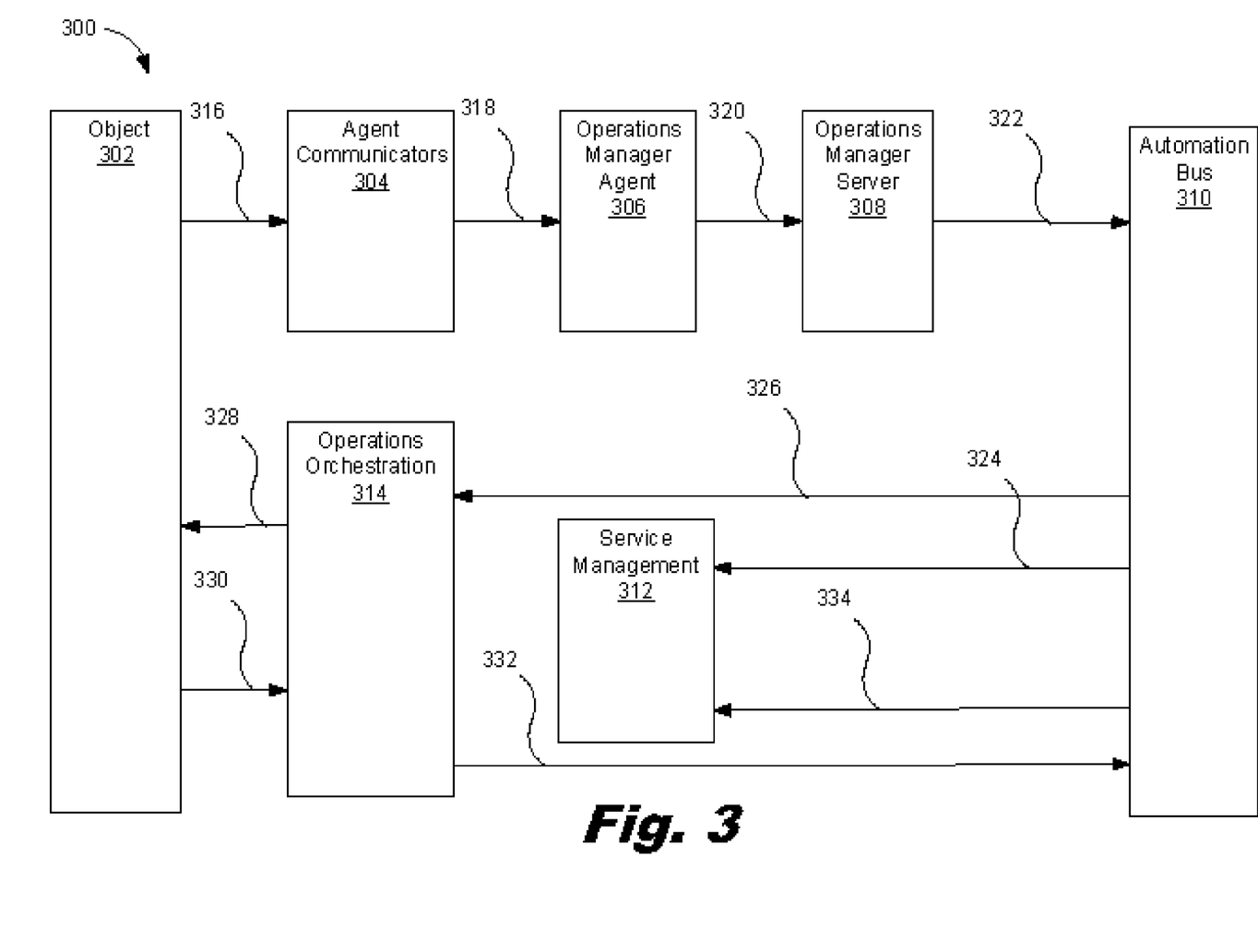
FIG. 3 is a diagram of an example of a sequence for remediating an issue based on polices of an operations manager agent, according to one example of principles described herein.

FIG. 3 is a diagram of an illustrative sequence for remediating an issue based on polices of the operations manager agent, according to one example of principles described herein. As will be described below, the sequence (300) includes monitoring an object based on a number of parameters, alerting an operations manager agent of a potential issue to prevent an occurrence of the issue, and instantiating a remediation function for remediating the issue based on policies of the operations manager agent As mentioned above an object (302) is monitored by a monitoring system. In one example, the object (302) may be a log file. In another example, the object (302) may be an application component. The monitoring system alerts an agent communicator (304) of a potential issue with the object (302) as indicated by arrow (316). In this example, the agent communicator (304) alerts the operations manager agent (306) of the issue as indicated by arrow (318). As mentioned above, the issue is remediated based on polices of the operations manager agent (306). Further, the operations manager agent (306) may instantiate a remediation function for remediating the issue based on policies of the operations manager agent (306).

In one example, the policies of the operations manager agent (306) specify an action to take to remediate the issue. The action to be taken may be based on the type of message pattern detected and the number of times the pattern recurs over a specific period of time. In this example, the operations manager agent (306) determines there is an issue with the object (302). The operations manager agent (306) registers the issue with an operations manager server (308) as indicated by arrow (320) which then instantiates a remediation function.

In one example, the operations manager server (308) manages server operating systems and applications that run on the operations manager server (308). In other examples, the operations manager server (308) manages a number of agents in various locations.

In keeping with the given example, the operations manager server (308) sends a message to an automation bus (310) as indicated by arrow (322). The automation bus (310) receives the message and sends the message to a service management (312) as indicated by arrow (324). In this example, the service management (312) creates a ticket. The ticket may be an element contained within an issue tracking system which contains information about the issue an object is experiencing. In this example, the ticket is stored, in memory, on the service management (312). Further, the service management (312) may be a suite of service management tools developed for end-to-end monitoring of services of an object.

In keeping with the given example, the automation bus (310) sends a restore service request to the operations orchestration (314) as indicated by arrow (326). In one example, the restore service request is dictated by the policies of the operations manager agent (306). The operations orchestration (314) describes the automated arrangement, coordination, and management of complex computer systems, objects, and services.

In keeping with the given example, the operations orchestration (314) instantiates the execution of a script to restore service to the monitored object (302) as indicated by arrow (328). In one example, the script may be a predefined remedy that may remediate the issue of the object (302). Further, the script may be executed on the object (302) to remediate the issue of the object (302). The script sends the results of the execution back to the operations orchestration (314) as indicated by arrow (330).

The operations orchestration (314) sends the status of the script to the automation bus (310) as indicated by arrow (332). In one example, if the script is successful in remediating the issue of the object, the status indicates the script is successful in remediating the issue with the object (302). Alternatively, if the script is unsuccessful in remediating the issue with the object (302), the status indicates the script is unsuccessful. The automation bus (310) sends a message to the service management (312) as indicated by arrow (334) to update the ticket with the status of the script.

Figure 4:
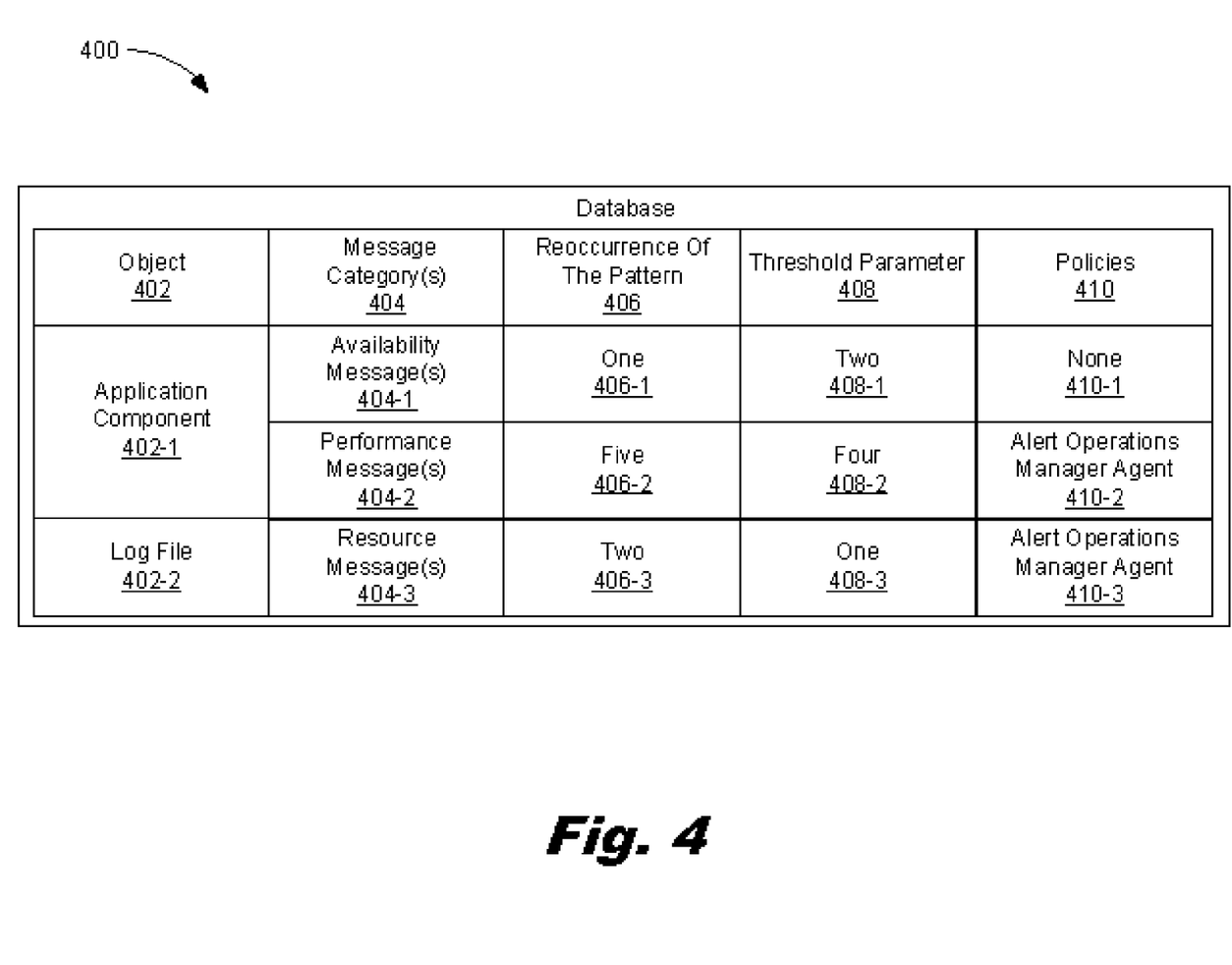
FIG. 4 is a diagram of an example of a database for objects being monitored, according to one example of principles described herein.

FIG. 4 is a diagram of an illustrative database for objects being monitored, according to one example of principles described herein. As will be described below, a monitoring system may include a database that stores, in memory, information about objects that are being monitored. Further, the database may include other information that is related to the objects being monitored.

In one example, the database (400) may include a number of objects (402). In this example, the objects (402) include an application component (402-1) and a log file (402-2) that are being monitored by the monitoring system of FIG. 1. As mentioned above, the monitoring system of FIG. 1 categorizes messages of the object into categories. In this example, the database (400) includes message categories (404). Consequently, the monitoring system of FIG. 1 categorizes a message of an object that is a resource message into a resource messages category, a message of an object that is a performance message into a performance messages category, a message of an object that is an availability message into an availability message category, or combinations thereof.

In this example, the application component (402-1) includes two message categories, namely, an availability messages (404-1) category and a performance messages (404-2) category. The log file (402-2) includes one message category, namely, a resource messages (402-3) category.

As mentioned above, the monitoring system of FIG. 1 detects an issue with the object (402) based on the recurrence of a pattern of messages. This includes comparing the number of times the pattern of messages recurs over a period of time with a threshold parameter.

In this example, the database includes the number of times the pattern (406) occurs over a specific period of time. In one example, the recurrence of a pattern of the availability messages (404-1) is one (406-1), meaning that the pattern has occurred only a single time. While, the threshold parameter (408) for of the availability message pattern (404-1) is two (408-1). Thus, in this example, the recurrence of the availability message pattern (404-1) does not exceed the threshold parameter of two (408-1). As a result, no action (410-1) is taken according to the policies (401) of the operations manager agent since the availability messages (404-1) do not indicate an availability issue.

In the current example, the pattern of the performance messages (404-2) has recurred five times (406-2). In this example, the threshold parameter (408) for recurrence of the performance message pattern (404-2) is four (408-2). Thus, the recurrence of the performance message pattern (404-2) exceeds the threshold parameter of four (408-1). As a result, the policies (410) indicate to alert (410-2) the operations manager agent to instantiate a remediation function to remediate the issue.

In the current example, the pattern of the resource messages (404-3) has recurred twice (406-3). The threshold parameter (408) for recurrence of the resource message pattern (404-3) is one (408-3). Consequently, in this example the recurrence of the resource message pattern (404-3) exceeds the threshold parameter of one (408-3). As a result, the policies (410) indicate to alert (410-3) the operations manager agent to instantiate a remediation function to remediate the issue.

While this example has been described with reference to three message categories, the database may include any number of message categories. Further, while this example has been described with reference to two object's information being stored in the database, the database may store information about several or thousands of objects. While this example has been described with reference to messages being received from the object, the object may be interrogated for performance, availability, resources, or combinations thereof.

Figure 5:
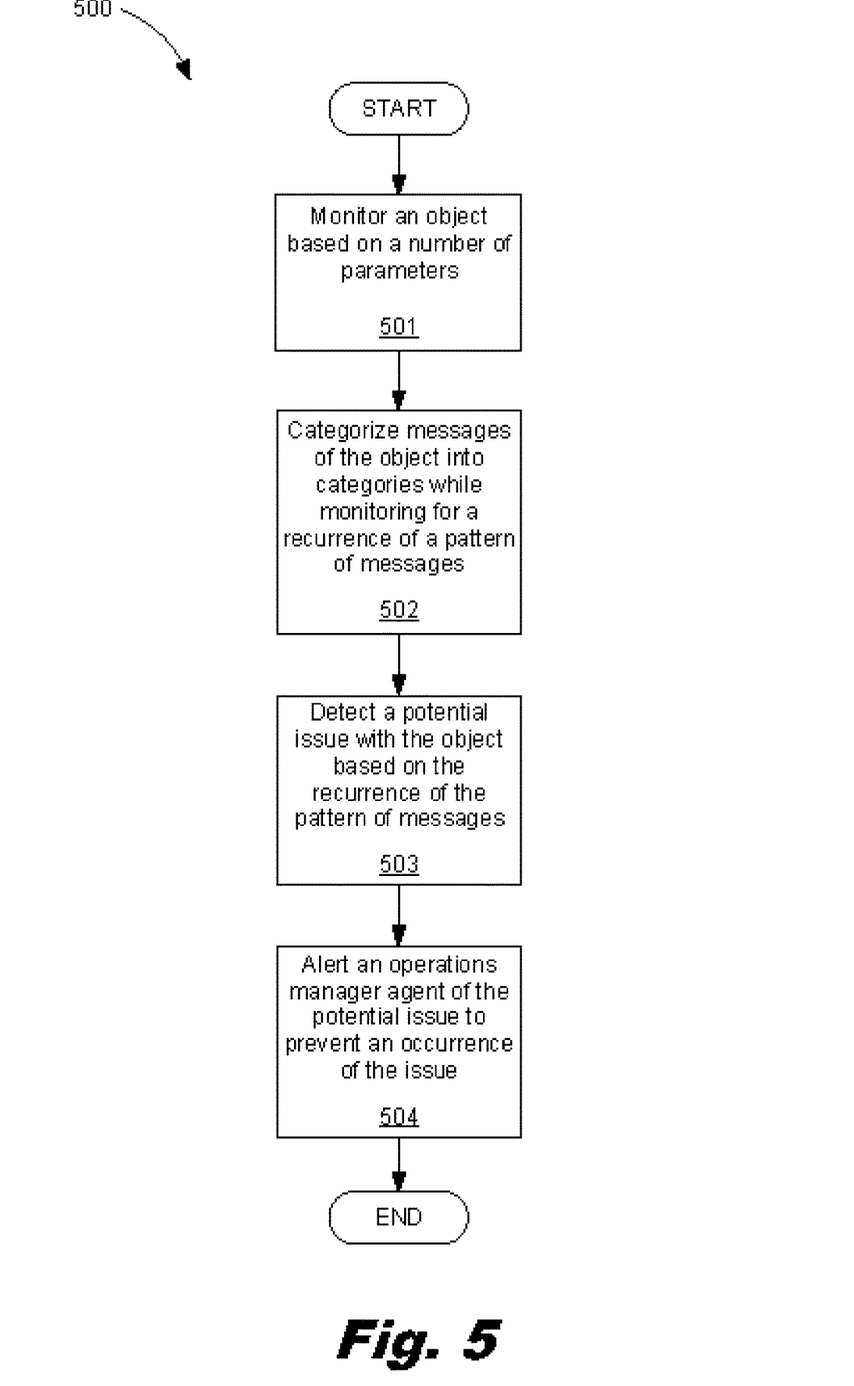
FIG. 5 is a flowchart of an example of a method for monitoring an object to prevent an occurrence of an issue, according to one example of principles described herein.

FIG. 5 is a flowchart of an illustrative method for monitoring an object to prevent an occurrence of an issue, according to one example of principles described herein. In one example, the method (500) may be executed by the monitoring system (200) of FIG. 2. In other examples, the method (500) may be executed by other systems described herein (e.g., system 300, system 700, system 800, etc.). In one example, the method (500) includes monitoring (501) an object based on a number of parameters, categorizing (502) messages of the object into categories while monitoring for a recurrence of a pattern of messages, detecting (503) an issue with the object based on the recurrence of the pattern of the messages, and alerting (504) an operations manager agent of the issue to prevent an occurrence of the issue.

As mentioned above, the method (500) includes monitoring (501) an object based on a number of parameters. In one example, an object may be an application component. In this example, an application component monitor monitors the application component for performance, resource, and/or availability. In this example, the application component monitor monitors the application component based on a number of parameters to determine a desired performance and a desired availability of the application component.

Further, monitoring the application component based on a number of parameters includes, monitoring the application component based on a monitoring frequency parameter. For example, the component parameters specify when the application component monitor monitors the application component.

In one example, the component parameters specify that the application component monitor is to monitor the application component based on a specific time interval. For example, a specific time interval may be a second, a minute, an hour, other time measurements, or combinations thereof.

In another example, the component parameters specify that the application component monitor is to monitor the application component based on an event. For example, an event may include when an application component is first powered on, when a device accesses the application component, if the application component's memory is accessed, other events, or combinations thereof.

As mentioned above, the application component parameters include parameters that include a threshold parameter. In one example, a threshold parameter may specify how many times a message or message pattern may occur over a specific period of time. For example, the threshold parameter may specify that a message, such as a performance message, may occur three times over a specific period of time such as an hour. In another example, the threshold parameter may specify that the message may occur ten times over a specific period of time such as a day.

As mentioned above, the application component parameters include performance parameters. In one example, the performance parameters may include performance parameters such as a central processing unit (CPU) usage, a throughput, other performance parameters, or combinations thereof.

As mentioned above, the application component parameters include availability parameters. In one example, the availability parameters specify when an application component is available to be utilized for processing information. For example, if an application component is in standby, the application component can be utilized for processing information at any time during standby. Alternatively, if the application component is busy processing information, the application component cannot be utilized for processing additional information. As a result, if the application component cannot be utilized for processing information while the application component is in standby, this may indicate an issue with the application component.

As mentioned above, the application component parameters include resource parameters. In one example, the resource parameters may specify what resources an object may utilize. Further, the resource parameters may include memory parameters, thread parameters, other resource parameters, or combinations thereof.

As mentioned above, the application component parameters include the application install location, the port number, and the user name. In one example, the application install location may indicate where the application component is installed. For example, the application component may be installed on a server, a user device, other locations, or combinations thereof. The port number may specify a port number for the application component to establish host-to-host connectivity. The user name may specify the name of the application component. For example, an application component such as a user device may include a user name such as business device.

Further, monitoring an object, such as an application component, may include receiving messages from the application component. For example, the messages, such as a resource message, may be produced by the application component and received by the application component monitor. Still further, monitoring an object, such as an application component, may include interrogating the application component for performance, availability, resources, or combinations thereof. For example, the application component monitor of FIG. 2 may interrogate the application component for the application component's performance. In this example, values for the performance parameters of the application component are received. Similarly, the application component monitor may interrogate the application component for the application component's availability and resources.

In the current example, a log file may include a number of parameters such as location parameters and log file parsing parameters. In one example, a location parameter may specify where the monitoring system may monitor objects. For example, the location parameter may specify to monitor objects in databases, application components, user devices, other locations, or combinations thereof. In another example, the location parameter may specify a log file location.

As mentioned above, a log file may include a number of parameters such as log file parsing parameters. In one example, the log file parsing parameters specify how a log file is to be parsed. The log file parsing parameters may specify a log file is to be parsed based on a string, a character, a variable, other parsing parameters, or combinations thereof.

As mentioned above, the method (500) includes categorizing (502) messages of the object into categories based on a recurrence of a patter of the messages. In one example, categorizing (502) the messages of the object into categories based on a recurrence of a pattern of the messages includes categorizing a message of an object that is a resource message into a resource messages category, a message of an object that is a performance message into a performance messages category, a message of an object that is an availability message into an availability message category, or combinations thereof. Further, a resource message may include memory messages, thread messages, other resource messages, or combinations thereof.

Further, a message may be categorized into a satisfactory category and an unsatisfactory category. In one example, if the message indicates that an object's availability, performance, resources, and/or overall health are satisfactory, the message may be categorized in the satisfactory category. In this example, if the message is categorized in the satisfactory category, the message is determined to not indicate an issue. As a result, the messages in the satisfactory category may not be used when comparing the number of times the recurrence of the pattern of the messages reoccurs over a period of time with a threshold parameter.

Alternatively, a message may indicate that an object's availability, performance, resources, and/or overall health are unsatisfactory. In one example, if the message indicates that an object's availability, performance, resources, and overall health are unsatisfactory, the message may be categorized in the unsatisfactory category. In this example, if the message is categorized in the unsatisfactory category, the message may be used when comparing the number of times the recurrence of the pattern of the messages reoccurs over a period of time with a threshold parameter.

As mentioned above, the method (500) includes detecting (503) an issue with the object based on the recurrence of the pattern of the messages. In one example, detecting the issue with the object based on the recurrence of the pattern of the messages includes comparing the number of times the pattern of the messages recurs over a period of time with a threshold parameter.

For example, the threshold parameter may specify that a performance message for an application component may occur no more than three times over a time period such as an hour. In this example, if the performance message for the application component occurs two times in one hour, the threshold parameter is not reached. As a result, an issue with the performance of the application is not detected. In the current example, if the performance message for the application component occurs four times in one hour, the threshold parameter is reached. As a result, an issue with the performance of the application component is detected.

As mentioned above, the method (500) includes alerting (504) an operations manager agent of the message pattern as indicative of a potential issue so as to prevent an occurrence of the issue. As mentioned above, the operations manager agent may be alerted via an agent communicator. For example, the operations manager agent may be alerted by an application component agent communicator for an application component that is being monitored. In another example, the operations manager agent may be alerted by a log file agent communicator for a log file that is being monitored.

Figure 6:
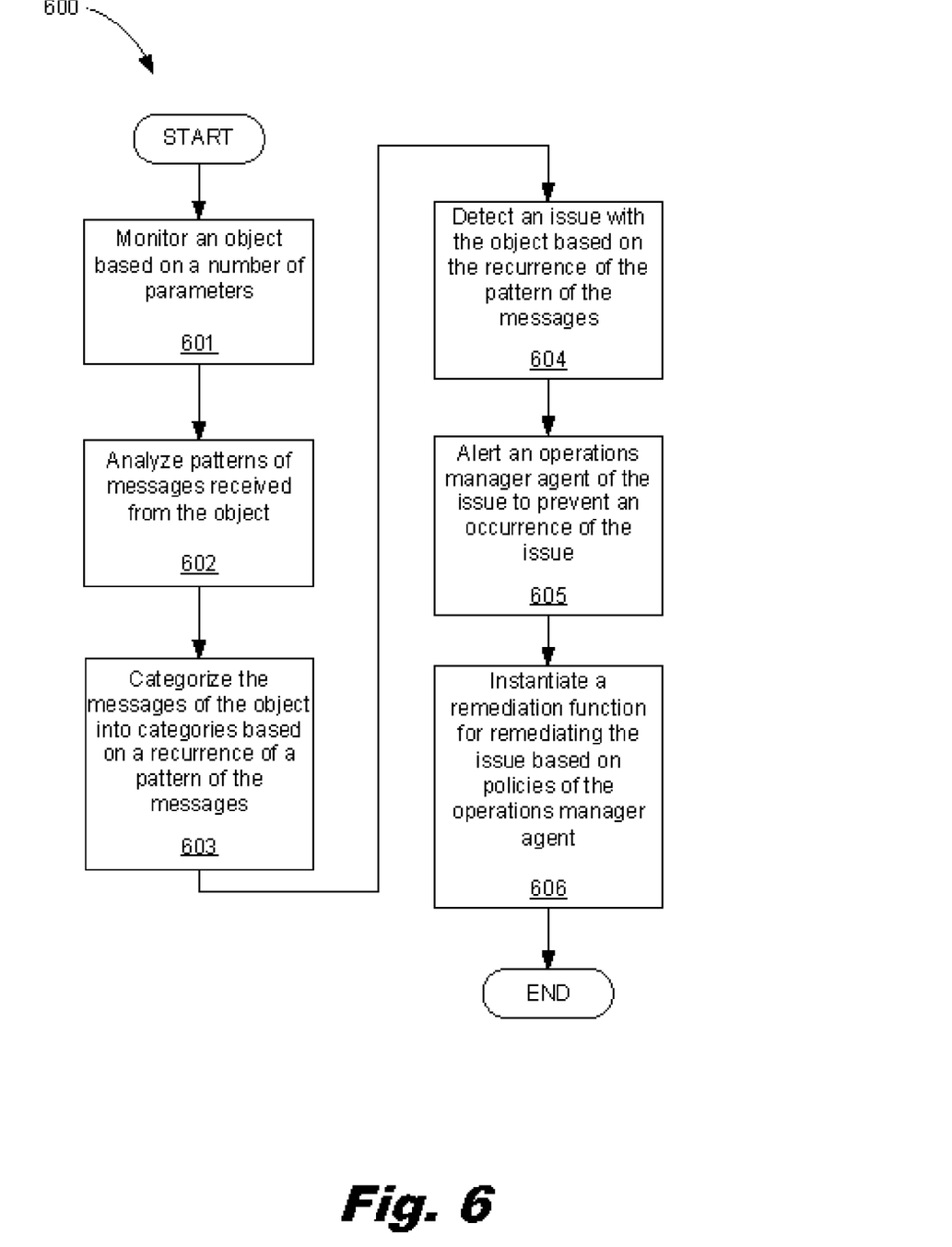
FIG. 6 is a flowchart of an example of a method for monitoring an object to prevent an occurrence of an issue, according to one example of principles described herein.

FIG. 6 is a flowchart of an illustrative method for monitoring an object to prevent an occurrence of an issue, according to one example of principles described herein. In one example, the method (600) may be executed by the monitoring system (200) of FIG. 2. In other examples, the method (600) may be executed by other systems described herein (e.g., system 700, system 800, etc.). In one example, the method (600) includes monitoring (601) an object based on a number of parameters, analyzing (602) patterns of messages received from the object, categorizing (603) messages of the object into categories based on message type and the recurrence of a pattern in the messages, detecting (604) an issue with the object based on the recurrence of the pattern of the messages, alerting (605) an operations manager agent of the issue to prevent an occurrence of the issue, and instantiating (606) a remediation function for remediating the issue based on policies of the operations manager agent.

As mentioned above, the method (600) includes analyzing (602) patterns of messages received from the object. As mentioned above, the monitoring system of FIG. 1 may receive messages such as performance messages, availability messages, resource messages, or combinations thereof. In one example, a sequence of messages may be monitored and analyzed in real-time as follows; a resource message, a performance message, an availability message, a resource message, and a performance message. In this example, when a resource message occurs, a performance message follows. Further, by analyzing such patterns of the messages of the object according to a number of parameters, the monitoring system may note that a performance message occurs because there was a resource message. As a result, the performance message may not be indicative of the cause of an issue. However, the resource message may be indicative of the cause of an issue.

The method may concurrently analyze or monitor for several different patterns in the messages. For example, the method may analyze ten patterns of the messages. The method may also analyze a pattern of values, received as messages, from interrogating the object for performance, availability, resources, or combinations thereof.

As mentioned above, the method (600) includes instantiating (606) a remediation function for remediating the issue based on policies of the operations manager agent. As mentioned above, the operations manager agent may be alerted via an agent communicator. In this example, the operations manager agent many include a number of polices. The policies may determine a course of action to remediate the issue. For example, if the issue is a memory issue, the policies may specify the way to remediate the memory issue. If the issue is an availability issue, the policies may specify the way to remediate the availability issue.

As mentioned above, the remediation function for remediating the issue may be sent to a remediation system. Further, as mentioned in FIG. 3, remediating (606) the issue based on polices of the operations manager agent may include registering the issue on an operation manager server, restoring service, running a script on the object, and updating a ticket.

Figure 7:
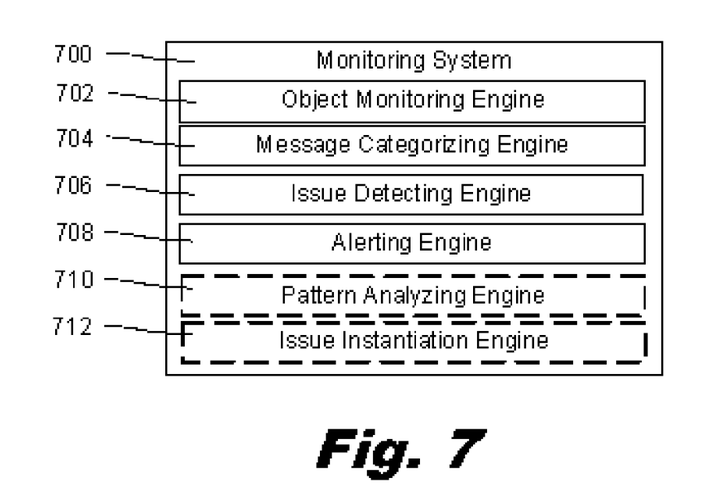
FIG. 7 is a diagram of an example of a monitoring system, according to one example of principles described herein.

FIG. 7 is a diagram of an example of a monitoring system, according to one example of principles described herein. The monitoring system (700) includes an object monitoring engine (702), a message categorizing engine (704), an issue detecting engine (706), and an alerting engine (708). In this example, the monitoring system (700) also includes a pattern analyzing engine (710) and an issue instantiation engine (712). The engines (702, 704, 706, 708, 710, 712) refer to a combination of hardware and program instructions to perform a designated function. Each of the engines (702, 704, 706, 708, 710, 712) may include a processor and memory. The program instructions are stored in the memory and cause the processor to execute the designated function of the engine.

The object monitoring engine (702) monitors an object based on a number of parameters. In one example, the object monitoring engine (702) monitors an application component. In another example, the object monitoring engine (702) monitors a log file. In yet another example, object monitoring engine (702) monitors a log file and an application component.

The message categorizing engine (704) categorizes messages of the object into categories based on type and looks for a recurrence of a pattern of messages. In one example, the message categorizing engine (704) categories a message of an object that is a resource message into a resource messages category, a message of an object that is a performance message into a performance messages category, a message of an object that is an availability message into an availability message category, or combinations thereof.

The issue detecting engine (706) detects an issue with the object based on the recurrence of the pattern of the messages. In one example, the issue detecting engine (706) detects an issue by comparing the number of times the pattern of the messages recurs over a period of time against a threshold parameter.

The alerting engine (708) alerts an operations manager agent of the issue to prevent an occurrence of the issue. In one example, the operations manager agent may be alerted via an agent communicator. For example, the alerting engine (708) alerts the operations manager agent via, an application component agent communicator for an application component that is being monitored. In another example, alerting engine (708) alerts the operations manager agent via a log file agent communicator for a log file that is being monitored.

The pattern analyzing engine (710) analyzes patterns of messages received from the object. In one example, the pattern analyzing engine (710) analyzes the messages of the object based, on the object's performance, availability, and resources, for a specific pattern.

The issue instantiation engine (712) instantiates a remediation function for remediating the issue based on policies of the operations manager agent. The policies may determine a course of action to remediate the issue. For example, if the issue is a memory issue, the policies may specify a way for the issue instantiation engine (712) to instantiate a remediation function for remediating the memory issue. If the issue is an availability issue, the policies may specify a way for the issue instantiation engine (712) to instantiate a remediation function for remediating the availability issue.

Figure 8:
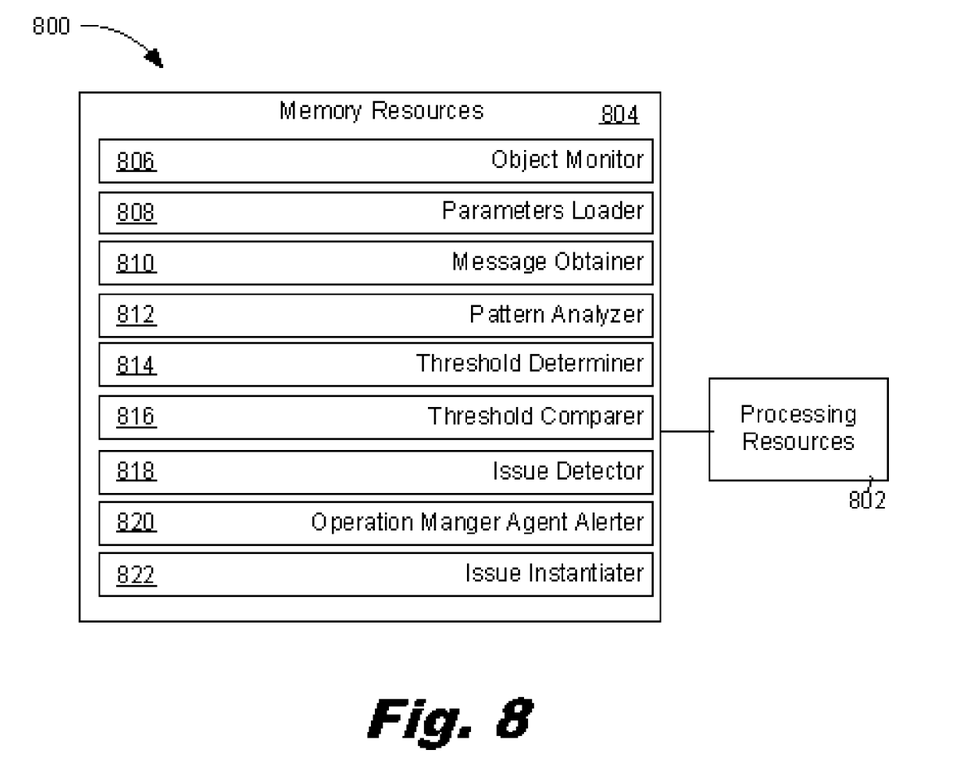
FIG. 8 is a diagram of an example of a monitoring system, according to one example of principles described herein.

FIG. 8 is a diagram of an example of a monitoring system, according to one example of principles described herein. In this example, monitoring system (800) includes processing resources (802) that are in communication with memory resources (804). Processing resources (802) include at least one processor and other resources used to process programmed instructions. The memory resources (804) represent generally any memory capable of storing data such as programmed instructions or data structures used by the monitoring system (800). The programmed instructions shown stored in the memory resources (804) include an object monitor (806), a parameters loader (808), a message obtainer (810), a pattern analyzer (812), a threshold determiner (814), a threshold comparer (816), an issue detector (818), an operations manager agent alerter (820), and an issue instantiater (822).

The memory resources (804) include a computer readable storage medium that contains computer readable program code to cause tasks to be executed by the processing resources (802). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The object monitor (806) represents programmed instructions that, when executed, cause the processing resources (802) to monitoring an object based on a number of parameters. The parameters loader (808) represents programmed instructions that, when executed, cause the processing resources (802) to load a number of parameters, such as predefined parameters, used to monitor the object. The message obtainer (810) represents programmed instructions that, when executed, cause the processing resources (802) to obtain messages of the object by receiving messages from the object, or interrogating the object for performance, availability, resources, or combinations thereof. The pattern analyzer (812) represents programmed instructions that, when executed, cause the processing resources (802) to analyzing patterns of the messages received from the object.

The threshold determiner (814) represents programmed instructions that, when executed, cause the processing resources (802) to determine a threshold to determine a specific number of times a message can reoccurs over a period of time. The threshold comparer (816) represents programmed instructions that, when executed, cause the processing resources (802) to compare the number of times the recurrence of the pattern of the messages occurs over a period of time with a threshold parameter.

The issue detector (818) represents programmed instructions that, when executed, cause the processing resources (802) to detect an issue with the object based on the recurrence of the pattern of the messages. The operations manager agent alerter (820) represents programmed instructions that, when executed, cause the processing resources (802) to alert an operations manager agent of the issue to prevent an occurrence of the issue. The issue instantiater (822) represents programmed instructions that, when executed, cause the processing resources (802) to instantiate a remediation function for remediating the issue based on policies of the operations manager agent. Further, the memory resources (804) may be part of an installation package. In response to installing the installation package, the programmed instructions of the memory resources (804) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (802) and the memory resources (802) are located within the same physical component, such as a server, or a network component. The memory resources (804) may be part of the physical component's main memory, caches, registers, non-volatile memory, or elsewhere in the physical component's memory hierarchy. Alternatively, the memory resources (804) may be in communication with the processing resources (802) over a network. Further, the data structures, such as the libraries, may be accessed from a remote location over a network connection while the programmed instructions are located locally. Thus, the monitoring system (800) may be implemented on a user device, on a server, on a collection of servers, or combinations thereof.

The monitoring system (800) of FIG. 8 may be part of a general purpose computer. However, in alternative examples, the monitoring system (800) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method comprising:
monitoring an application component based on a number of parameters;
categorizing messages of the application component into categories;
detecting and analyzing patterns of messages that occur in the messages of the application component, wherein each of the patterns of messages is a sequence of the categories in an order;
monitoring how many times each of the patterns of messages occurs in the messages of the application component within a predetermined time period;
detecting an issue with the application component based on the order of the categories in the sequence and a number of the order occurring more than a predetermined number of times within the predetermined time period;

alerting an operations manager agent of the issue to prevent an occurrence of the issue; and instantiating a remediation function for remediating the issue based on policies of the operations manager agent, wherein the policies indicate execution of a script on an object to restore service to the object.

2. The method of claim 1, in which monitoring the application component based on the number of parameters comprises:

receiving the messages from the application component; and interrogating the application component for performance, availability, resources, or combinations thereof.

3. The method of claim 1, in which the detecting the issue with the application component further comprises, for each of the patterns of messages, comparing the number of times a respective pattern of messages has occurred within a time period with a threshold parameter.

4. The method of claim 3, in which the threshold parameter comprises a specific number of times the respective pattern of the messages can reoccur over the time period.

5. The method of claim 1, in which categorizing messages of the application component into categories based on a recurrence of a pattern of the messages comprises categorizing a message of the application component that is a resource message into a resource messages category, a message of the application component that is a performance message into a performance messages category, a message of the application component that is an availability message into an availability message category, or combinations thereof.

6. The method of claim 1, in which the number of parameters comprises a monitoring frequency parameter, threshold parameters, performance parameters, availability parameters, resource parameters, location parameters, log file parsing parameters, or combinations thereof.

7. A system for monitoring an application component to prevent an occurrence of an issue, the system comprising:

at least one processor; and a memory storing instructions that, when executed by the at least one processor, cause the system to:

monitor the application component based on a number of parameters;

categorize messages received from the application component into categories;

detect and analyze patterns of messages that occur in the messages received from the application component, wherein each of the patterns of messages is a sequence of the categories in an order;

detect the issue with the application component by determining the order of the categories in the sequence occurs with respective categories associated with the messages of the application component and a number of times the order occurs within a predetermined period of time;

alert an operations manager agent of the issue to prevent the occurrence of the issue; and instantiate a remediation function for remediating the issue based on policies of the operations manager agent, wherein the policies indicate an execution of a script on an object to restore service to the object.

8. The system of claim 7, in which the instructions further cause the system to categorize a message of the application component that is a resource message into a resource messages category, a message of the application component that is a performance message into a performance messages category, a message of the application component that is an availability message into an availability message category, or combinations thereof.

9. The system of claim 7, in which the instructions further cause the system to, for each of the patterns of messages, compare the number of times a respective pattern of messages occurs in the messages of the application component within the predetermined period of time with a threshold parameter.

10. The system of claim 7, in which the number of parameters comprises a monitoring frequency parameter, a threshold parameter, performance parameters, availability parameters, resource parameters, location parameters, log file parsing parameters, or combinations thereof.

11. A computer program product for monitoring an application component to prevent an occurrence of an issue, comprising:

a non-transitory computer readable storage medium, said non-transitory computer readable storage medium comprising computer readable program code embodied therewith, said computer readable program code comprising program instructions that, when executed, causes a processor to:

monitor the application component based on a number of parameters;

categorize the messages received from the application component into categories;

detect and analyze patterns of messages in messages received from the application component, wherein each of the patterns of messages is a sequence of the categories in an order;

monitor how many times each of the patterns of messages occurs in the messages of the application component within a predetermined period of time;

detect the issue with the application component based on that the order of the categories in the sequence occurs with respective categories associated with the messages and that a number of occurrences of the order is more than a predetermined number of times within the predetermined period of time alert an operations manager agent of the issue to prevent the occurrence of the issue; and instantiate a remediation function for remediating the issue based on policies of the operations manager agent, wherein the policies indicate an execution of a script on an object to restore service to the object.

* * * * *